No. 658,975. Patented Oct. 2, 1900.
T. CLANCY.
VALVE.
(Application filed July 30, 1900.)
(No Model.)
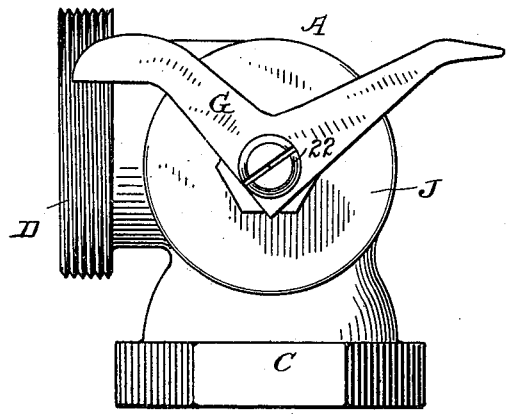
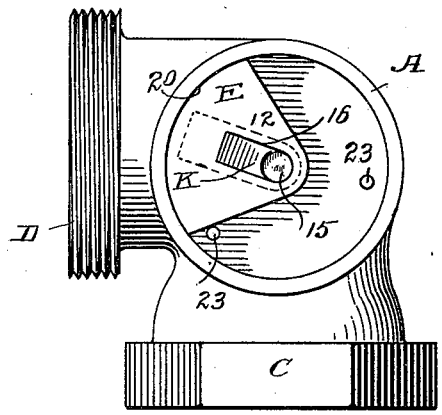
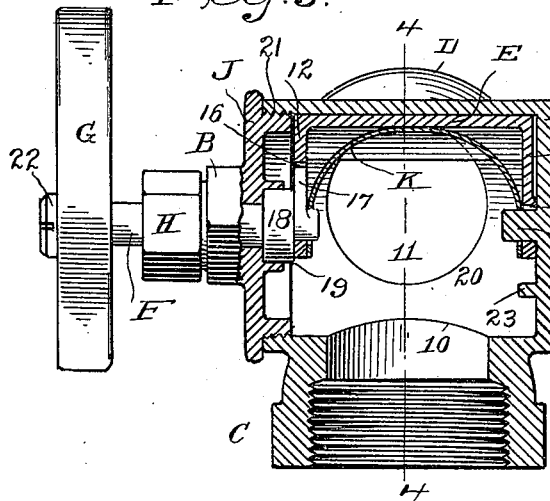
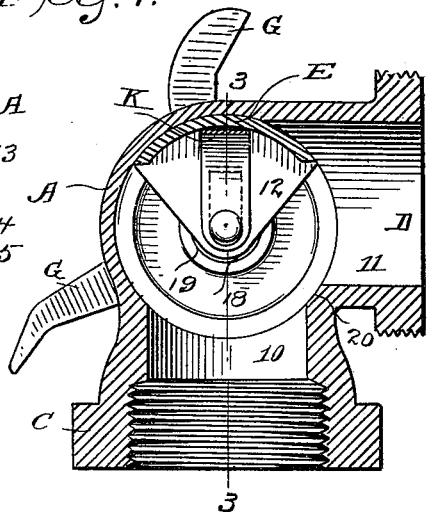
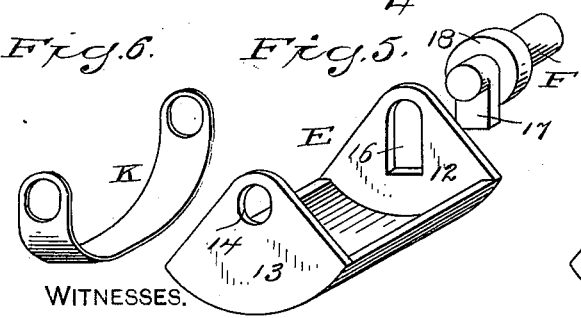
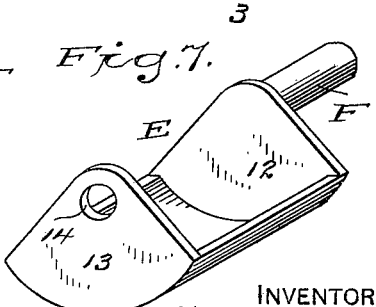
WITNESSES.
H. A. Lamb.
S. W. Atherton.
INVENTOR.
Thomas Clancy
By F. M. Wooster
Atty.

UNITED STATES PATENT OFFICE.

THOMAS CLANCY, OF BRIDGEPORT, CONNECTICUT.

VALVE.

SPECIFICATION forming part of Letters Patent No. 658,975, dated October 2, 1900.

Application filed July 30, 1900. Serial No. 25,229. (No model.)

*To all whom it may concern:*

Be it known that I, THOMAS CLANCY, a citizen of the United States, residing at Bridgeport, county of Fairfield, State of Connecticut, have invented a new and useful Valve, of which the following is a specification.

My invention has for its object to provide a valve which shall be adapted for general use, and especially adapted for use as a hot-water-radiator valve, my novel valve being durable, practically impossible to get out of repair, easily and quickly operated to open and close, attractive in appearance, and consisting of but few parts and those easy to make, so that my novel valve, while superior in operation to other valves of the class now in the market, is cheaper to make and can be placed upon the market at a lower price than any other valve of its class.

In the accompanying drawings, forming part of this specification, Figure 1 is a side elevation of my novel valve complete, the cover or valve proper being in the closing position; Fig. 2, a similar view, the cap, lever, and spindle being removed; Fig. 3, a section of the body and valve proper on the line 3 3 in Fig. 4, the valve being in a partly-open position; Fig. 4, a section on the line 4 4 in Fig. 3; Fig. 5, a perspective of the cover or valve proper and the inner end of the spindle detached; Fig. 6, a perspective of the spring detached, and Fig. 7 is a perspective of a slightly-modified form in which the spindle may be made integral with the cover or valve and no spring is used.

A denotes the body; B, the hub; C, the inlet or pipe end; D, the outlet or union end; E, the cover or valve proper, which is arc-shaped and oscillates in the body; F, the spindle; G, the lever or operating device; H, the packing nut, and J the cap.

The interior of the body is cylindrical, preferably ground smooth, is open at one end, and is provided with an inlet-opening 10 and an outlet-opening 11. These openings are adapted to be either wholly or partially covered or closed alternately by the arc-shaped cover or valve proper, E. This cover or valve is provided with arms 12 and 13, said arm 13 being provided with an opening 14, adapted to receive a stud 15, which is cast upon or rigidly secured to the body at the center of the inner end thereof, and arm 12 being provided with an angular opening 16, adapted to receive an angular lug 17 upon the spindle F. I have shown the spindle as provided with a hub 18, which lies in a socket 19 in the inner face of the cap.

K denotes a bow spring, the ends of which engage stud 15 and the inner end of the spindle, respectively, and which bears against the inner side of the valve and holds it pressed tightly against the inner periphery of the body, said inner periphery of the body constituting the valve-seat and being indicated by 20.

23 denotes stops which may be placed either upon the inner end of the body or upon the cap to limit the oscillation of the valve in either direction.

The mode of assembling my novel valve will be readily understood from Fig. 3. The cover or valve proper, with the spring lying therein and the lug upon the spindle in engagement with opening 16, is passed in at the open end of the body, stud 15 at the inner end of the body engaging hole 14 in arm 13 of the valve. The cap J is then turned to place, the open end of the body and the cap being provided with corresponding screw-threads, as at 21. After the above-mentioned parts are all in place lever D may be secured to the spindle by means of a screw 22.

In the form illustrated in Fig. 7 the spring is omitted, the cover or valve proper is cast integral with or is rigidly secured to the spindle, and the hole 14 in the spindle is made to closely engage stud 15 upon the inner end of the body, so that the valve will fit closely enough in place for many uses—for example, in hot-water radiators, in which, if the valve engages the seat too closely, it is common to make a small opening through the valve in order to prevent entire stoppage of circulation.

Having thus described my invention, I claim—

1. The combination with a cylindrical valve-body having inlet and outlet openings and a stud 15 at its inner end, of an oscillatory arc-shaped valve having arms one of which is provided with an opening to receive stud 15 and the other with an angular opening, a spindle having an angular lug adapted to engage the angular opening and a spring engaging stud 15 and the inner end of the spindle and acting to press the valve against the inner periphery of the body.

2. The combination with a cylindrical valve-body having inlet and outlet openings, of an oscillatory arc-shaped valve adapted to close either of said openings and a bow spring whose ends have bearings at the ends of the valve and which bears against the inner side of the valve to hold it pressed against the inner periphery of the body.

In testimony whereof I affix my signature in presence of two witnesses.

THOMAS CLANCY.

Witnesses:
A. M. WOOSTER,
W. F. HURLBURT.